July 31, 1956     M. C. ARMSTRONG     2,756,944
FISHING LINE REEL
Filed Sept. 20, 1954
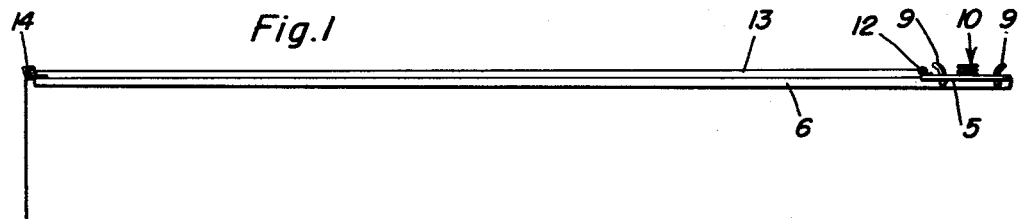
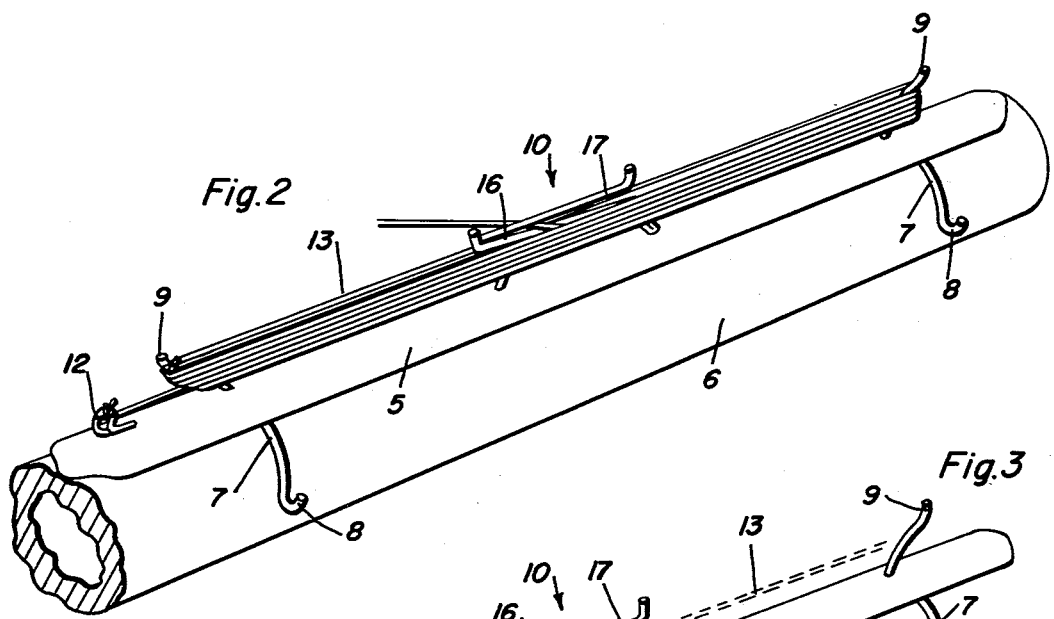
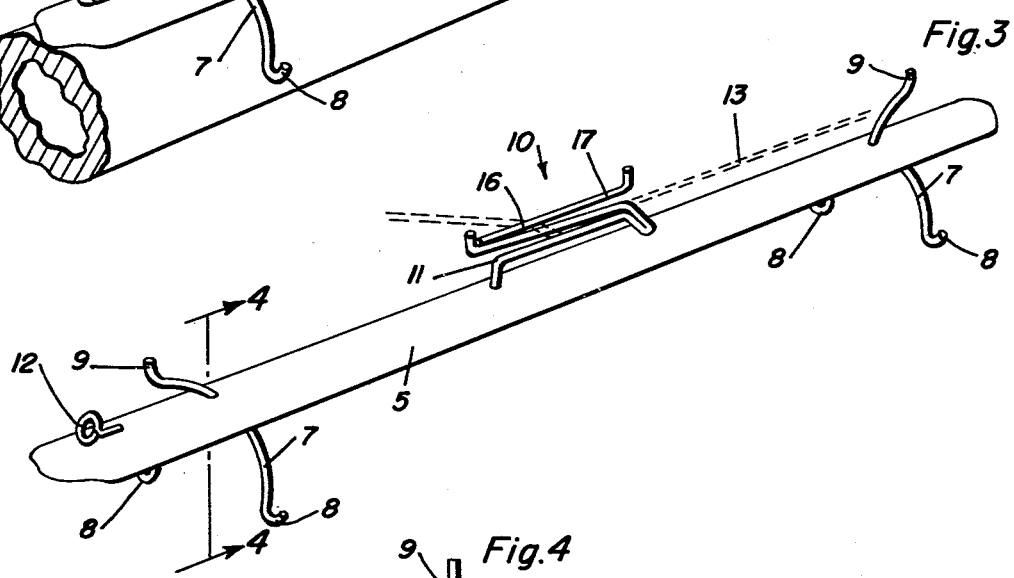
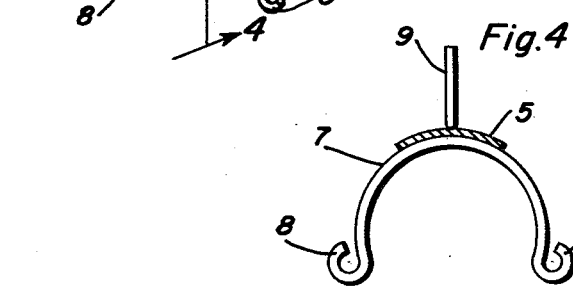
Mearle C. Armstrong
INVENTOR.

United States Patent Office 2,756,944
Patented July 31, 1956

2,756,944

FISHING LINE REEL

Mearle C. Armstrong, Rensselaer, Ind.

Application September 20, 1954, Serial No. 457,059

1 Claim. (Cl. 242—84.1)

The present invention relates to new and useful improvements in fishing line reels or holders and has for its primary object to provide, in a manner as hereinafter set forth, a device of this character which is adapted to be expeditiously mounted for use on a conventional fishing pole or rod.

Another very important object of the invention is to provide a reel attachment of the aforementioned character for fishing poles which will firmly hold the line after it has been wound thereon.

Other objects of the invention are to provide a fishing line reel or holder of the character set forth which will be comparatively simple in construction, strong, durable, compact, light in weight and which may be manufactured at low cost.

All of the foregoing and still other objects and advantages of the invention will become apparent from a study of the following specification, taken in connection with the accompanying drawing wherein like characters of reference designate corresponding parts throughout the several views, and wherein:

Figure 1 is a view in side elevation showing a reel constructed in accordance with the present invention mounted on a fishing pole;

Figure 2 is a perspective view of the device with the line wound thereon;

Figure 3 is a perspective view, showing the device removed from the pole; and

Figure 4 is a view in transverse section, taken substantially on the line 4—4 of Figure 3.

Referring now to the drawing in detail, it will be seen that the embodiment of the invention which has been illustrated comprises a bar 5 of metal, plastic or other suitable material. The bar 5 is adapted to be mounted longitudinally on the butt or inner end portion of a conventional fishing pole, as at 6. Toward this end, the bar 5 is of arcuate transverse section and said bar has fixed beneath its end portions a pair of substantially C-shaped resilient clamps 7. The clamps 7 are adapted to snap around the pole 6. The clamps 7 terminate in outwardly turned end portions 8.

Fixed on the outer side of the bar 5, also on the end portions thereof, is a pair of metallic hooks 9. Fixed longitudinally on the bar 5 between the hooks 9 is a resilient wire clip 10 comprising a bail 11 which is bent upon itself at one end and formed to provide a rod 16. Mounted on the rod 16 and cooperable therewith is a finger 17. An eye 12 is mounted on the forward end portion of the bar 5.

It is thought that the manner in which the device is used will be readily apparent from a consideration of the foregoing. Briefly, the resilient clamps 7 are snapped or engaged around the pole 6 for securing the bar 5 longitudinally thereon. One end of the fishing line 13 is secured to the eye 12, said fishing line passing outwardly through a conventional guide 14 on the forward end or tip of the pole 6. When the tackle is not in use, the usual lure, sinker, etc., are removed from the line 13 and said line is wrapped or wound back and forth around the oppositely inclined hooks 9 on the bar 5. The free end portion of the line 13 is then frictionally anchored in the resilient clip 10 in the manner shown to advantage in Figure 3 of the drawing. Of course, the reel or holder with the fishing line wound thereon may be removed from the pole, if desired. The clip 10 functions as a divider for the runs of the wound line.

It is believed that the many advantages of a fishing line reel or holder constructed in accordance with the present invention will be readily understood, and although a preferred embodiment of the device is as illustrated and described, it is to be understood that changes in the details of construction may be resorted to which will fall within the scope of the invention as claimed.

What is claimed is:

A fishing line reel of the character described comprising: a bar of arcuate transverse section for mounting longitudinally on a fishing pole, substantially C-shaped, resilient clamps on the end portions of the bar engageable around the pole for removably mounting said bar thereon, an eye on one end portion of the bar for connecting one end of a fishing line thereto, longitudinally spaced hooks on the bar adapted to have the line wound therearound, an elongated bail mounted longitudinally on the bar intermediate the hooks, and a finger on the bail cooperable therewith for frictionally anchoring the other end portion of the line therebetween, said bail and finger separating and laterally supporting the runs of the line.

References Cited in the file of this patent

UNITED STATES PATENTS

| 959,623 | Shakespeare et al. | May 31, 1910 |
| 2,366,755 | Rogne | Nov. 10, 1943 |

FOREIGN PATENTS

| 585,959 | France | Mar. 12, 1925 |
| 77,882 | Sweden | July 25, 1933 |